United States Patent [19]

Tatsuki et al.

[11] Patent Number: 5,450,401
[45] Date of Patent: Sep. 12, 1995

[54] TIME SLOT SWITCHING DEVICE WITH A SINGLE DATA MEMORY

[75] Inventors: Noboru Tatsuki; Hideaki Funae, both of Tokyo, Japan

[73] Assignee: NEC Corporation, Tokyo, Japan

[21] Appl. No.: 333,338

[22] Filed: Nov. 1, 1994

Related U.S. Application Data

[63] Continuation of Ser. No. 79,911, Jun. 23, 1993, abandoned.

[30] Foreign Application Priority Data

Jun. 23, 1992 [JP] Japan .................. 4-163234

[51] Int. Cl.[6] .................................. H04J 3/06
[52] U.S. Cl. .................... 370/68; 370/105.1
[58] Field of Search ............. 370/68, 66, 67, 58.1, 370/59, 53, 58.2, 58.3, 68.1, 105.1, 100.1; 340/825.4, 825.2

[56] References Cited

U.S. PATENT DOCUMENTS

| | | | |
|---|---|---|---|
| 4,543,652 | 9/1985 | Amada et al. | 370/66 |
| 4,905,226 | 2/1990 | Kobayashi | 370/66 |
| 4,941,141 | 7/1990 | Hayano | 370/68 |
| 4,984,821 | 1/1990 | Hayano | 370/58.1 |
| 5,130,979 | 7/1992 | Ohtawa | 370/68 |
| 5,155,728 | 10/1992 | Takeuchi et al. | 370/58.1 |

Primary Examiner—Douglas W. Olms
Assistant Examiner—Huy D. Vu
Attorney, Agent, or Firm—Sughrue, Mion, Zinn, Macpeak & Seas

[57] ABSTRACT

For switching data time slots between input and output data signals, each having a multiframe structure, a time slot switching device comprises only one time slot switching circuit. Consequently, the device comprises a sole data memory, a single novel write address generator, and only one novel read address generator. The write address generator comprises first through N-th frame synchronization units, where N represents the number of attributes by which the data time slots are featured. Connected to the frame synchronization units, a selector is controlled by a switch mode memory (SWM) controlled, in turn, by a central processing unit. Like each conventional read address generator, the novel read address generator comprises an address control memory (ACM) controlled by the central processing unit. Only one phase adjusting circuit is used to adjust operation of the read address generator relative to that of the write address generator as regards phases of operation.

3 Claims, 4 Drawing Sheets

TIME SLOT SWITCHING DEVICE WITH A SINGLE DATA MEMORY

This is a Continuation of application Ser. No. 08/079,911 filed Jun. 23, 1993 now abandoned.

BACKGROUND OF THE INVENTION

This invention relates to a time slot switching or relocating device for use in time division multiplex communication in dealing with a multiframe signal.

In the manner which will become clear as the description proceeds, such a time slot switching device is supplied with an input data signal and produces an output data signal. The input data signal comprises data time slots featured by a first plurality of attributes and comprises successions of unit frames, which successions are multiplexed into the multiframe signal. Each unit frame comprises a contiguous part of the data time slots as a second plurality of frame time slots. In each unit frame of the output data signal, the frame time slots are switched or relocated into switched time slots in accordance with the attributes.

As will later be described a little more in detail, a conventional time slot switching device comprises data memories, the first plurality in number. In one-to-one correspondence, the data memories are accompanied by write address generators and read address generators. Each write address generator generates a write address signal. Each read address generator generates a read address signal.

The input data signal is supplied to a particular memory of the data memories. Generated by one of the write address generators that corresponds to the particular memory, the write address signal stores a predetermined number of the data time slots in the particular memory as stored time slots or stored data. Generated by one of the read address generators that corresponds to the particular memory, the read address signal reads the stored data as a particular output signal. The particular output signal is supplied to other memories, namely, to others of the data memories.

Generated by others of the write address generators, the write address signals store the particular output signal in the other memories as different stored data. Generated by others of the read address generators, the read address signals read the different stored data as different output signals.

The different output signals are delivered to phase adjusting circuits, the first plurality less one in number. The phase adjusting circuits are consequently in one-to-one correspondence to the different output signals.

The different output signals have phases subjected to phase adjustment and are produced as phase adjusted signals by the phase adjusting circuits corresponding thereto. With the phases so adjusted, the different output signals are superposed on the input data signal. The particular and the different output signals are collectively used as the output data signal.

The conventional time slot replacing device has had several disadvantages which are objectionable particular when the input data signal is featured by a great number of attributes. For example, the conventional time slot switching device must have an enormous hardware scale, suffers from a complicated control, and produces the output data signal with an undesiredly long delay.

SUMMARY OF THE INVENTION

It is consequently an object of the present invention to provide a time slot switching device which is compact.

It is another object of this invention to provide a time slot switching device which is of the type described and which is easy to control.

It is still another object of this invention to provide a time slot switching device which is of the type described and which gives an output data signal a shortest possible delay.

It is yet another object of this invention to provide a time slot switching device which is of the type described and which comprises only one data memory.

It is a further object of this invention to provide a time slot switching device which is of the type described and which comprises only one novel write address generator.

It is a still further object of this invention to provide a time slot switching device which is of the type described and which comprises only one novel read address generator.

It is a yet further object of this invention to provide a time slot switching device which is of the type described and which comprises only one phase adjusting circuit.

Other objects of this invention will become clear as the description proceeds.

On setting forth the gist of this invention, it is possible to understand that a time slot switching device is responsive to an input data signal comprising data time slots featured by a first plurality of attributes and a unit frame consisting of a second plurality of frame time slots of the data time slots with each of the frame time slots featured by one of the attributes for producing an output data signal in which the frame time slots are switched in accordance with the attributes. This time slot switching device comprises memory means supplied with the input data signal for keeping a predetermined number of the data time slots as stored data, write address generating means connected to the memory means for generating a write address signal to store the stored data in the memory means, and read address generating means connected to the memory means for generating a read address signal to read the stored data as the output data signal.

In accordance with this invention, the memory means of the above-understood time slot switching device comprises a data memory supplied with the input data signal. The write address signal generating means comprises a write address generator for supplying the write address signal to the data memory. The read address generating means comprises a read address generator for supplying the read address signal to the data memory.

DESCRIPTION OF THE PREFERRED EMBODIMENT

Figure 1:
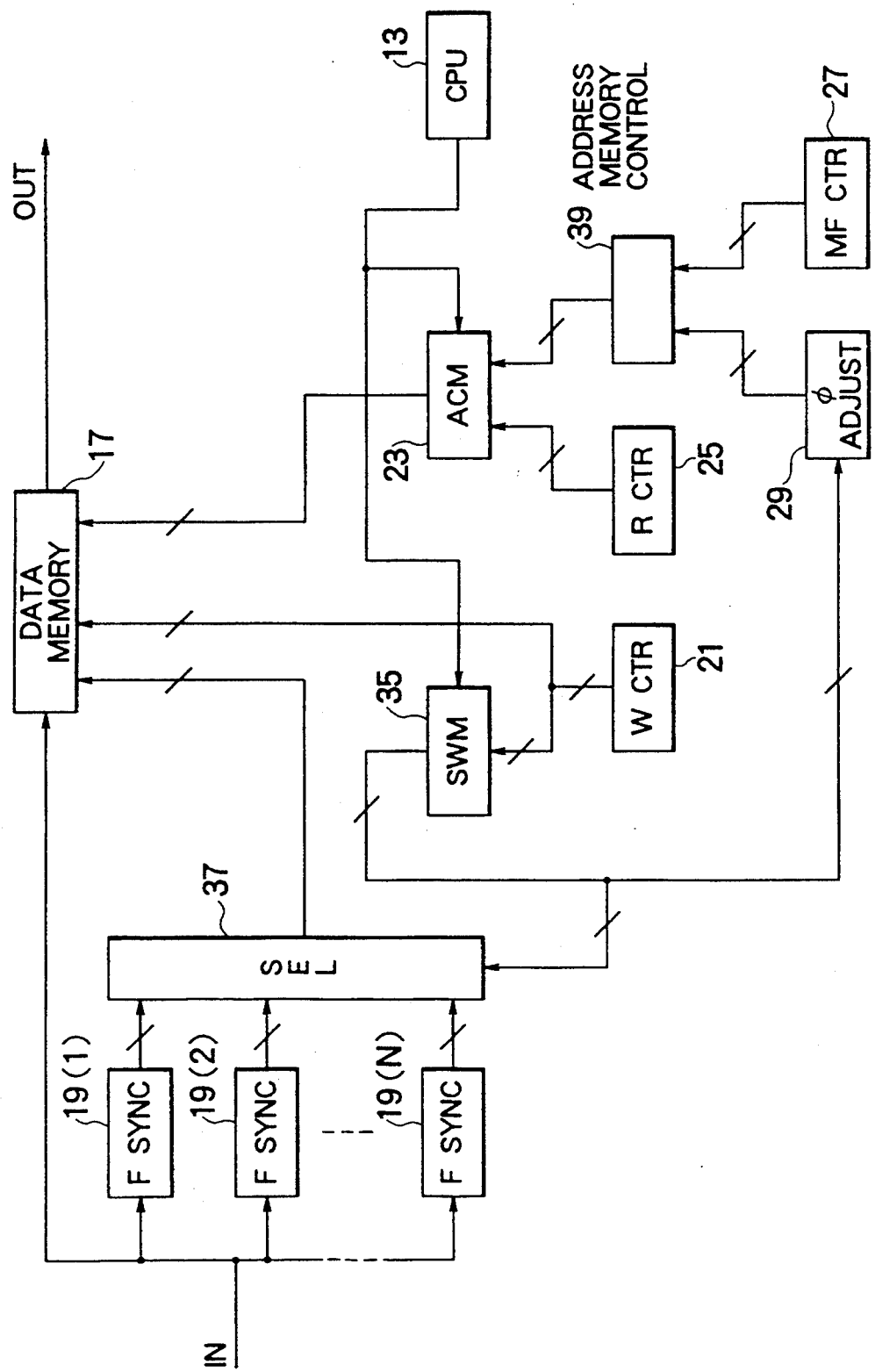
FIG. 1 is a block diagram of a time slot switching device according to an embodiment of the instant invention.

Before describing the present invention with reference to FIGS. 1 through 3, FIG. 4 will be referred to in order to describe a conventional time slot switching device. This is for the purpose of facilitating an understanding of this invention.

An input data signal IN comprises data time slots featured by first through N-th attributes as will later be described, where N represents a first plurality. In the input data signal, a second plurality of consecutive ones of the data time slots are arranged as a unit frame consisting of first through X-th time slots, where X represents the second plurality.

The input data signal is supplied to a first time slot switching circuit 11(1). In the manner which will become clear as the description proceeds, the first time slot switching circuit 11(1) is controlled by a central processing unit (CPU) 13 and produces a first circuit output signal by dealing with the input data signal in accordance with the first attribute.

The first circuit output signal is supplied in parallel to second through N-th time slot switching circuits 11(2) to 11(N) controlled by the central processing unit 13. By dealing with the first circuit output signal according to an n-th attribute, where n is variable in general between 1 and N, both inclusive, an n-th time slot switching circuit 11(n) of the second through the N-th time slot switching circuits 11 (suffixes omitted) produces an n-th circuit output signal with a phase.

Such second through N-th circuit output signals are delivered to first through (N-1)-th phase adjusting circuits 15(1) to 15(N-1). Adjusting the phases of the second through the N-th circuit output signals, the first through the (N-1)-th phase adjusting circuits 15 (suffixes omitted) produce phase adjusted signals.

The first time slot switching circuit 11(1) is eventually supplied with the input data signal on which the phase adjusted signals are successively superposed. The first time slot switching circuit 11(1) thereby produces an output data signal OUT.

In the first time slot switching circuit 11(1), the input data signal is supplied to a first data memory 17 and to a first frame synchronization unit (F SYNC) 19(1). In the manner depicted, the n-th time slot switching circuit 11(n) includes an n-th data memory (unnumbered). The second through the N-th time slot switching circuits 11 include second through N-th frame synchronization units 19(2) to 19(N). Among the second through the N-th frame synchronization units 19 (suffixes omitted), the N-th frame synchronization unit 19(N) will later be depicted.

The first data memory 17 is accompanied by a write address counter (W CTR) 21. A combination of the first frame synchronization unit 19(1) and the write address counter 21 serves as a first write address generator for supplying a write address signal to the data memory 17.

The first data memory 17 is accompanied furthermore by an address control memory (ACM) 23 which is controlled by the central processing unit 13 and is accompanied, in turn, by a read address counter (R CTR) 25 and a multiframe counter (MF CTR) 27. A combination of the address control memory 23, the write address counter 25, and the multiframe counter 27 serves as a read address generator for supplying a read address signal to the data memory, such as 17, under control of the central processing unit 13.

In the manner which will be described in greater detail as the description proceeds, the input data signal is a multiframe signal into which successions of unit frames are multiplexed. The first through the N-th time slot switching circuits 11 are for dealing with the multiframe signal in accordance with the first through the N-th attributes.

Controlled in the first time slot switching circuit 11(1) by the write address signal, the data memory 17 is loaded with the data time slots of the first attribute as stored data. Controlled by the read address signal which, in turn, is controlled by the central processing unit 13, the data memory 17 produces the stored data as the first circuit output signal. In the first circuit output signal, the data time slots under consideration are switched or relocated.

The first circuit output signal is supplied as described in the foregoing to the second through the N-th time slot switching circuits 11 in parallel. Controlled by the central processing unit 13, the n-th time slot switching circuit 11(n) produces the n-th circuit output signal in which the data time slots of the n-th attributes are switched. The n-th circuit output signal is delivered to an (n-1)-th phase adjusting circuit 15(n-1).

The first through the N-th time slot switching circuits 11 are similar in structure. Each time slot switching circuit comprises a certain number of circuit elements, such as the data memory. The conventional time slot switching device has a ladder structure or cross-bridged structure in which the first through the N-th time slot switching circuits 11 and the first through the (N-1)-th phase adjusting circuits 15 are interconnected in a ladder fashion. The device must include the first through the (N-1)-th phase adjusting circuits 15 which unavoidably gives a delay to the input data signal on deriving the output data signal.

When the input data signal is featured by a great number of attributes, the conventional time slot switching device must comprise an accordingly great number of time slot switching circuits and has an enormous hardware scale. The ladder structure inevitably necessitates a complicated control. A great number of phase adjusting circuits give rise to an objectionably long delay.

Referring now to FIG. 1, the description will proceed to a novel time slot switching device according to a preferred embodiment of this invention. Similar parts are designated by like reference numerals and are operable with similarly named and likewise labelled signals.

When compared with the conventional time slot switching device illustrated with reference to FIG. 4, the novel time slot switching device consists of only one time slot switching circuit controlled by the central processing unit 13. As a consequence, the novel time slot switching device comprises only one data memory 17, only one novel write address generator for supplying the write address signal to the data memory 17, and only one novel read address generator for supplying the read address signal to the data memory 17. Moreover, only one phase adjusting circuit (o ADJUST) 29 is used instead of the phase adjusting circuits 15.

Figure 4:
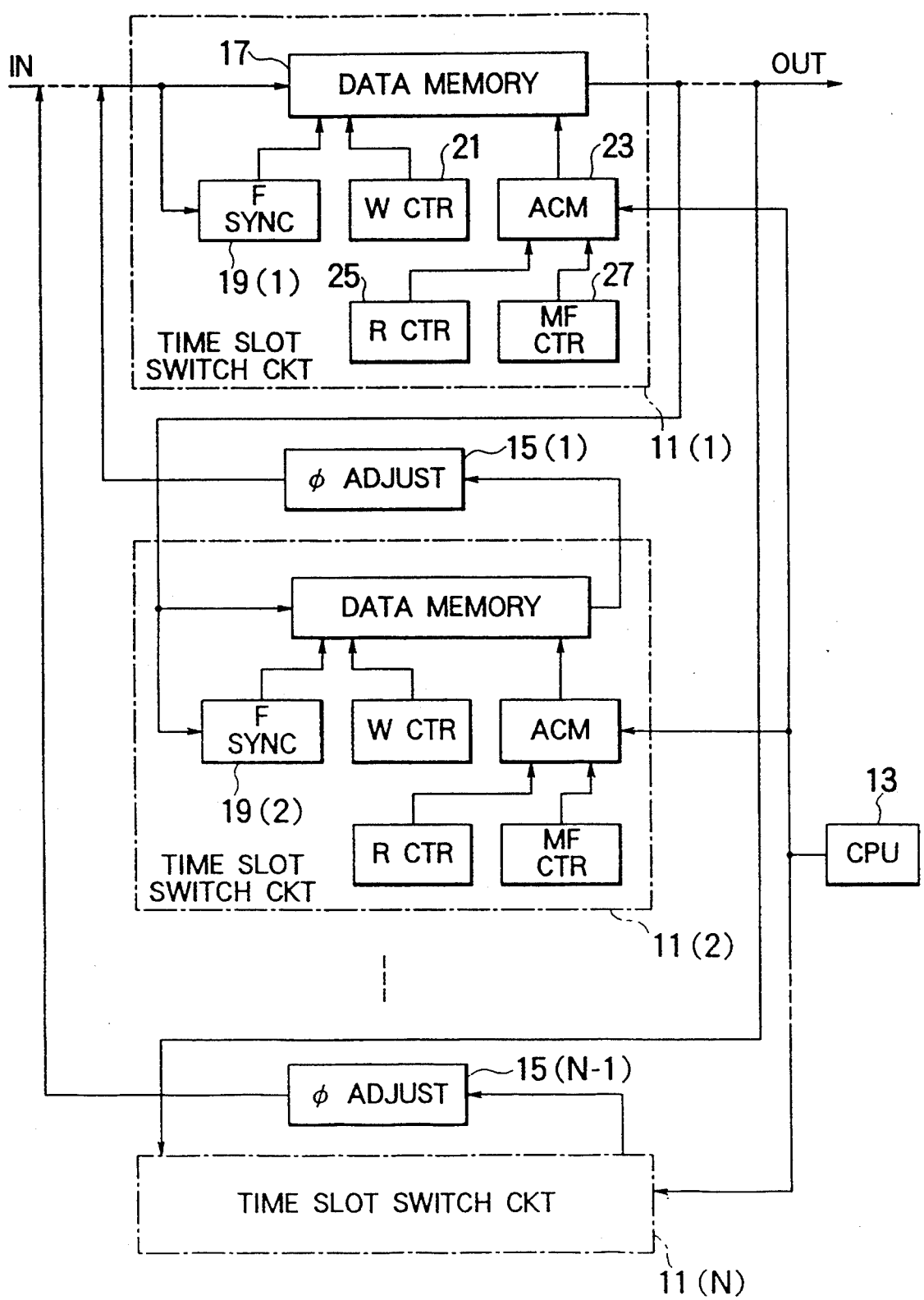
FIG. 4 is a block diagram of a conventional time slot switching device.

In the novel time slot switching device, the first through the N-th frame synchronization units 19 are used like in FIG. 4. The novel write address generator includes the frame synchronization units 19 and the write address counter 21 and is controlled, in contrast to the write address generator described in conjunction with FIG. 4, by the central processing unit 13. The novel read address generator includes the access control memory 23 controlled by the central processing unit 13, the read address counter 25, and the multiframe counter 27. Each of the write and the read address counters 21 and 25 will alternatively be called a time slot counter (TS CTR).

In general, such a time slot switching device is used primarily in a time division multiplexing device of a digital communication network comprising a plurality of media which are of a variety of types. The media deal with media data signals of various attributes or types, a first plurality N in number.

In the time division multiplexing device, the media data signals are represented by sequences of data time slots. Consecutive ones, a second plurality X in number, of the data time slots are arranged as frame time slots in a unit frame. Such unit frames are multiplexed into a multiframe signal of a multiframe structure which comprises multiframes having various multiframe lengths and various multiframe periods. The multiframe lengths have a maximum frame length. The time slot switching device deals with the multiframe signal to accommodate or terminate the media data signals.

The input data signal IN is the multiframe signal. In the output data signal OUT, the time slots of the multiframe signal are arranged in accordance with the attributes in the manner which will presently be exemplified.

Figure 2:
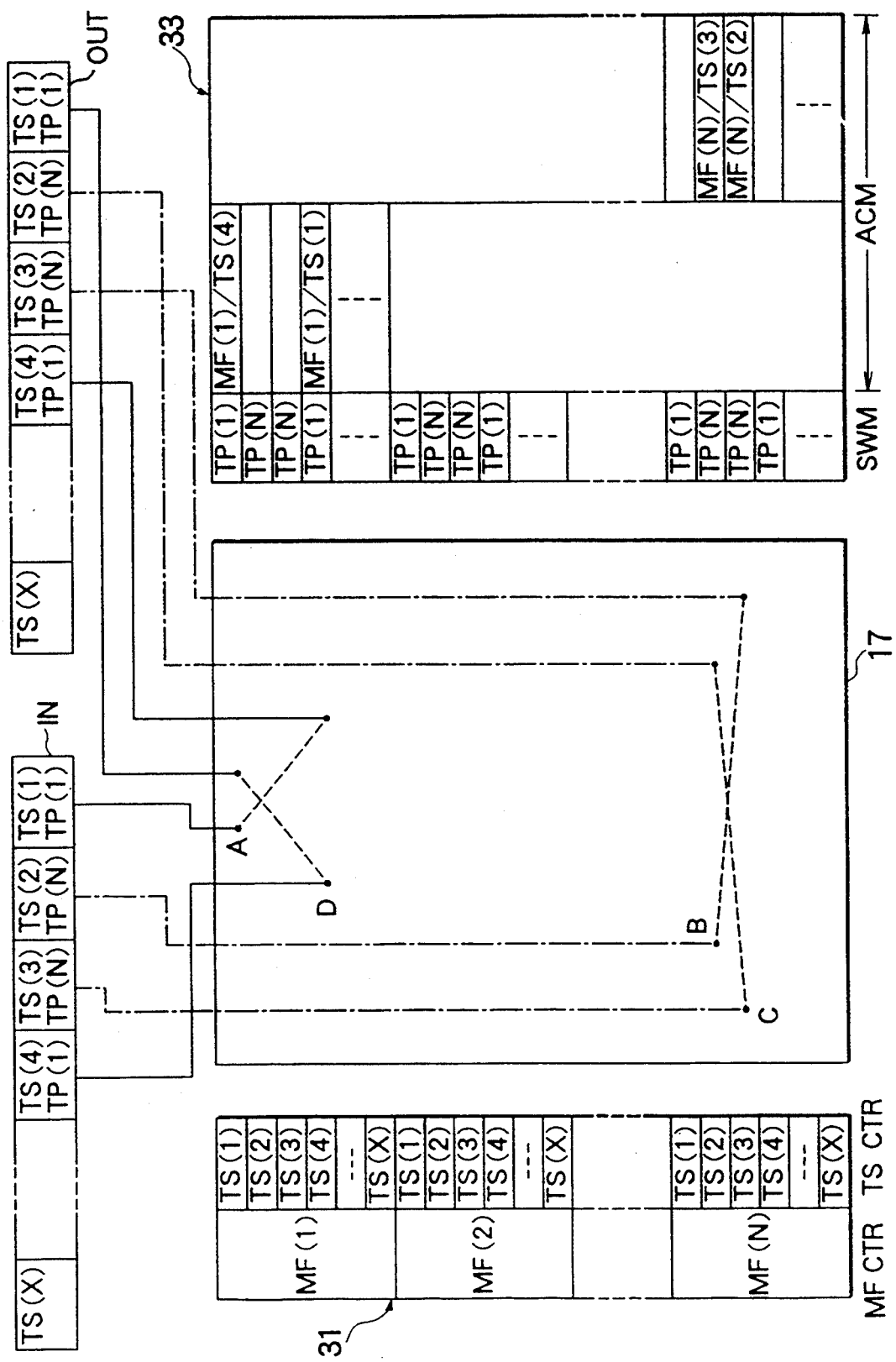
FIG. 2 is a diagram for use in describing operation of the time slot switching device depicted in FIG. 1.

Turning temporarily to FIG. 2, the attributes will be specified by first through N-th attributes or types TP(1) to TP(N). A unit frame of the input data signal is illustrated at IN. In the example being illustrated, the unit frame consists of a first time slot TS(1) of a datum A of the first attribute TP(1), a second time slot TS(2) of a datum B of the N-th attribute TP(N), a third time slot TS(3) of a datum C of the N-th attribute TP(N), a fourth time slot TS(4) of a datum D of the first attribute TP(1), ..., and an X-th time slot TS(X) of a datum of a certain attribute.

A unit frame of the output data signal is depicted at OUT. In the illustrated example, the unit frame consists of a first time slot TS(1) of the datum D of the first attribute TP(1), a second time slot TS(2) of the datum C of the N-th attribute TP(N), a third time slot TS(3) of the datum B of the N-th attribute TP(N), a fourth time slot TS(4) of the datum A of the first attribute TP(1), ..., and an X-th time slot TS(X) of a datum of a certain attribute.

In the manner exemplified, the data time slots of the input data signal are switched in the output data signal in accordance with the attributes. Such attributes will later be described once more in conjunction with a specific example.

It should be noted that the frame time slots of each unit frame need not be featured by all of the first through the N-th attributes but may be featured by only a part of the attributes. This applies to the data time slots of each multiframe.

Turning back to FIG. 1 with FIG. 2 continuously referred to, the data memory 17 is depicted also in FIG. 2 by a block indicated by the reference numeral 17. The data memory 17 has an internal structure which is illustrated in a block 31 separately from the block 17 and will become clear in the following. Operation of the write and the read address generators is exemplified in another block 33.

In FIGS. 1 and 2, the data memory 17 has a memory capacity of at least one maximum frame length and comprises first through N-th memory sections in one-to-one correspondence to the first through the N-th attributes or types TP (suffixes omitted). It is possible to understand that the first through the N-th attributes correspond to first through N-th multiframes MF(1) to MF(N) and are so labelled in the block 31.

These multiframes MF (suffixes omitted) are specified by a multiframe count signal produced by the multiframe counter 27. This fact is indicated below the block 31 by a label MF CTR. In practice, the memory sections are specified by the write and the read address signals in the manner which will shortly become clear.

Each memory section comprises first through X-th memory units in one-to-one correspondence to the first through the X-th time slots TS (suffixes omitted). The memory units are specified by the time slot counter 21 or 23 as indicated below the block 31 by another label TS CTR.

It should be noted that the memory sections and the memory units are vertically extended in the block 31 merely for convenience of illustration. By the write address signal produced by the write address generator, a predetermined number of data time slots of various multiframes are stored in the data memory 17 as stored time slots. The predetermined number of data time slots have the maximum frame length.

The first time slots through the X-th time slots of unit frames of each multiframe are stored as stored data in the first memory units through the X-th memory units of pertinent ones of the first through the N-th memory sections. These pertinent memory sections correspond to the attributes by which the stored time slots are featured. The data memory 17 may keep the stored data together with no time slots when such a multiframe has a multiframe length which is shorter than the maximum frame length.

The write address counter 21 produces a write count signal used in the write address signal in specifying the memory units of pertinent ones of the memory sections in synchronism with the data time slots in the input data signal. The read address counter 25 produces a read count signal for use in the read address signal in identifying the memory units of relevant ones of the memory sections.

The multiframe counter 27 has a count length which is equal to the maximum frame length. The multiframe counter 27 produces the multiframe count signal described above. The multiframe count signal indicates various multiframes and consequently the first through the N-th attributes. For example, the multiframe count signal represents first through N-th multiframe counts in correspondence to first through N-th multiframes. When the multiframe count is the largest, the multiframe count signal indicates the multiframes having the maximum frame length. In this manner, the multiframe count signal specifies the first through the N-th memory sections in the read address signal.

The novel write address generator comprises a switch mode memory (SWM) 35 which has a memory capacity of at least one maximum frame length and is controlled by the central processing unit 13 and by the write address counter 21. The central processing unit 13 stores in the switch mode memory 35 the attributes by which the data time slots are featured in each multiframe period, namely, in each of various multiframes. As an attribute indicating signal, the switch mode memory 35 produces in response to the write count signal a switch mode signal indicative of the attributes by which the data time slots are individually featured.

In FIG. 2, the switch mode signal is exemplified in the block 33 along a leftmost column labelled SWM. In the example being illustrated, the switch mode signal specifies, when the write count signal indicates the first through the fourth time slots TS(1) to TS(4) in each unit frame period, the first TP(1), the N-th TP(N), again the N-th TP(N), and again the first TP(1) attributes.

In the novel write address generator, the first through the N-th frame synchronization units 19 are in one-to-one correspondence to the first through the N-th attributes. Supplied directly with the input data signal, an n-th frame synchronization unit 19(n) produces an n-th selected sequence as an n-th attribute information signal. The n-th selected sequence represents those of the data time slots which are featured by the n-th attribute. In this manner, the first through the N-th frame synchronization units 19 produce first through N-th selected sequences.

In the novel write address generator, a selector unit (SEL) 37 is controlled by the switch mode signal supplied from the switch mode memory 35. From the first through the N-th selected sequences, the selector unit 37 selects collectively as a single selected sequence those of the first through the N-th selected sequences which are selected from time to time by the switch mode signal. The single selected sequence is used in the write address signal in identifying relevent ones of the memory sections.

Referring more particularly to FIGS. 1 and 2, the write address signal is generated by the novel write address generator to specify at a time a particular memory unit in a specific memory section. When the data memory 17 and the first through the N-th frame synchronization units 19 are supplied with the first time slot of the unit frame exemplified in FIG. 2 at IN, the write address signal stores the datum A in the data memory 17 as indicated by a point A which is depicted in the block 17 and related to the datum A of the unit frame IN by a solid line. In a like manner, the data B, C, D, and so forth of the unit frame IN are stored in the data memory 17 as indicated by points B, C, D, and so on which are depicted in the block 17 and related to the data in the unit frame IN by solid and dash-dot lines.

FIG. 2 will more particularly be referred to, with FIG. 1 continually referred to, on describing in greater detail the novel read address generator. In the manner described before in conjunction with an example in which the data or the frame time slots of the input data signal are switched or relocated in the output data signal, the datum A of the first time slot TS(1) in the unit frame IN of the input data signal is switched in the unit frame OUT of the output data signal to the fourth time slot TS(4).

Such data or frame time slots in the output data signal will be referred to as switched time slots. In other words, the stored time slots should be read as such switched time slots by the read address signal generated by the novel read address generator.

The output data signal has also the multiframe structure of output multiframes having the maximum frame length. For the output data signal, the phase adjusting circuit 29 adjusts the switch mode signal into a phase adjusted mode signal in compliance with a phase difference between the output multiframes and the multiframes in the input data signal. The phase adjusted mode signal is for giving the phase difference between the write and the read address signals.

The novel read address generator comprises an address memory control unit 39 having a memory capacity capable of dealing with the maximum frame length. Supplied with the multiframe count signal from the multiframe counter 27 and with the phase adjusted mode signal from the phase adjusting circuit 29, the address memory control unit 39 produces an address memory control signal for use in controlling the address control memory 23.

The address control memory 23 has a memory capacity of at least one maximum frame length. Contents of the address control memory 23 are exemplified in the block 33 along middle and rightmost columns which are collectively specified by a label ACM. The middle column shows the switched time slots to which the stored time slots are switched when the data or the frame time slots are featured in the input data signal by the first attribute TP(1) or are in the first multiframe MF(1). The rightmost column similarly shows the switched time slots when the data time slots are featured in the input data signal by the N-th attribute TP(N).

More specifically, the point D should be read out of the data memory 17 as a first time slot arranged among the switched time slots in the unit frame OUT in the manner indicated by a dashed line drawn in the block 17 from the point D, which first time slot is featured by the first attribute or is in the first multiframe as indicated by a symbol MF(1)/TS(1) in the middle column of the block 33 in correspondence to the data time slot depicted in the block 31 as the fourth time slot ST(4) of the first multiframe MF(1). In the manner listed in the rightmost column, the point C should be read out as a second time slot of the N-th multiframe MF(N)/TS(2). The point B should be read out as a third time slot in the N-th multiframe MF(N)/TS(3). As again depicted in the middle column, the point A should be read out as a fourth time slot of the first multiframe MF(1)/TS(4).

In this manner, the address control memory 23 is loaded by the central processing unit 13 with read attributes which are the attributes used in featuring the switched time slots. Controlled by the read count signal produced by the read address counter 25 and by the address memory control signal, the address control memory 23 produces the read address signal. In the read address signal, the attributes or the multiframes are indicated to identify the memory sections of the data memory 17 as identified sections. The time slots are specified in order to have access to the memory units in the identified sections.

Figure 3:
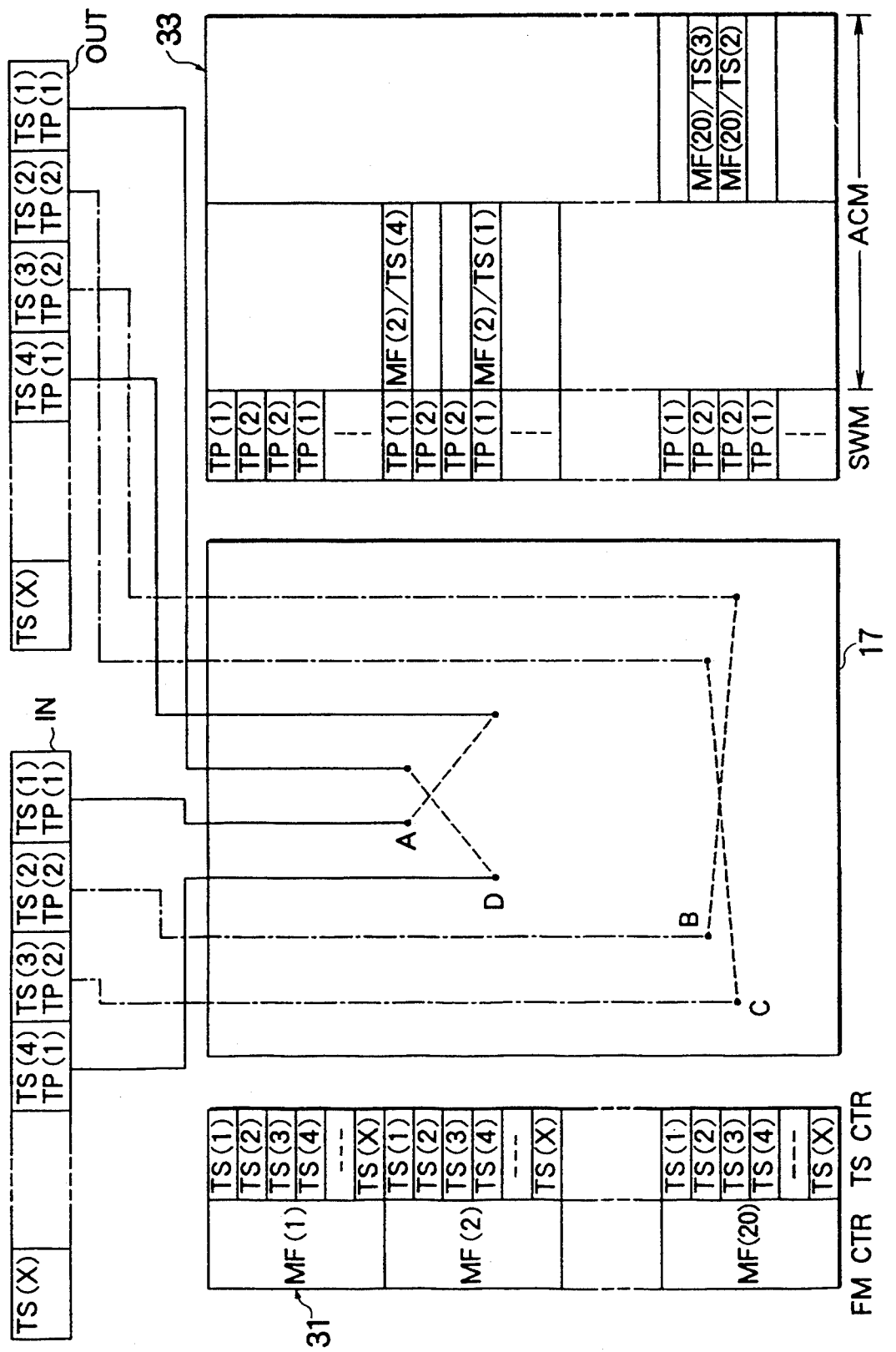
FIG. 3 is another diagram for use in describing operation of the time slot switching device shown in FIG. 1.

Referring afresh to FIG. 3 and again to FIG. 1, attention will be directed to the attributes of the specific example mentioned before. In FIG. 3, the unit frames are depicted once more at IN and OUT. Like in FIG. 2, the data memory is illustrated as the block 17. Its internal structure is shown in the block 31 with vertical extension. Operation of the novel write and read address generators is exemplified in the block 33.

In the specific example, the first attribute TP(1) may feature the data time slots having a two-multiframe structure. For this structure, the modifier "two-multiframe" signifies that two multiframes are dealt with as a unit and that such units are multiplexed. The second attribute TP(2) may feature the data time slots of a twenty-multiframe structure. In this structure, twenty multiframes are processed as a unit and such units are multiplexed.

In such multiframe structures, a frame bit is defined to indicate a head or leading end of each of the multiframes. Based on the frame bit, each of the frame synchronization units 19 detects the head of the multiframe.

In the unit frame IN, the first time slot TS(1) is featured by the first attribute TP(1) and is detected by the first frame synchronization unit 19(1). The second time slot TS(2) is featured by the second attribute TP(2) and is detected by the second frame synchronization unit 19(2).

In the blocks 31 and 33, the twentieth multiframe MF(20) corresponds to the N-th multiframe NF(N) described in connection with FIG. 2. In the blocks 17 and 33, the point C, namely, the stored time slot for the second time slot TS(2) of the second attribute TP(2), is read out of the data memory 17 as the switched time slot which is the third time slot of the second attribute or of the twentieth multiframe NF(20)/TS(3). It is believed that other illustrations in FIG. 3 are self-evident from FIG. 2.

Reviewing FIGS. 1 through 3, it is understood that the novel time slot switching device is saliently featured by the only one time slot switching circuit and consequently by the sole data memory 17, the single novel write address generator, and the only one novel read address generator. The novel time slot switching device is additionally featured by the single phase adjusting circuit 29 which is operable differently from the phase adjusting circuits 15 used in the conventional time slot switching device and may be understood as an element of the novel read address generator.

While this invention has thus far been described in specific conjunction with a single preferred embodiment thereof and with two modes of operation, it will now be readily possible for one skilled in the art to put this invention into effect in various other manners. For example, it is possible to implement the novel write and read address generators in various other ways.

What is claimed is:

1. A time slot switching device responsive to an input data signal comprising unit frames, each unit frame comprising first through X-th data time slots with each data time slot being characterized as having one of first through N-th attributes, where X and N are integers, for producing an output data signal in which said data time slots are switched into switched time slots in accordance with said first through N-th attributes, said input data signal having a multiframe structure of first through N-th multiframes characterized by one of said first through said N-th attributes, said time slot switching device comprising:

a central processing unit;

a write address counter for producing a write count signal indicative of said first through said X-th data time slots in said unit frames;

a switch mode memory, connected to said write address counter and loaded by said central processing unit with said first through said N-th attributes as write attributes, said switch mode memory being responsive to said write count signal to produce a switch mode signal indicative of said write attributes;

first through N-th frame synchronization units supplied with said input data signal for synchronizing the data time slots featured in said unit frames in accordance with said first through said N-th attributes to produce a first synchronized sequence of the data time slots featured by said first attribute through an N-th synchronized sequence of the data time slots featured by said N-th attribute;

a selector unit, connected to said switch mode memory and to said frame synchronization units, for selecting from said first through N-th synchronized sequences first through N-th selected sequences featured by said write attributes;

a single data memory, which is supplied with said input data signal and connected to said write address counter and to said selector unit, and in which the data time slots of said unit frames are stored as a stored data signal in accordance with said write count signal and said selected sequences;

a read address counter for producing a read count signal indicative of said data time slots repeatedly in said input frames;

a multiframe counter for producing a multiframe count signal representative of one of said first through said N-th multiframes at a time;

a phase adjusting circuit, connected to said switch mode memory, to produce a phase adjusted switch mode signal;

an address memory control unit, connected to said multiframe counter and to said phase adjusting circuit, for producing an address memory control signal in which said multiframe count signal is adjusted by said phase adjusted switch mode signal into an adjusted multiframe count signal; and an address control memory connected to said single data memory, to said read address counter, and to said address memory control unit, and which is loaded by said central processing unit, as read attributes, with said first through said N-th attributes featuring said switched time slots, said address control memory being responsive to said read count signal and to said address memory control signal to produce a read address signal for reading said stored data signal from said single data memory as said output data signal.

2. A time slot switching device as claimed in claim 1, wherein:

said single data memory comprises first through N-th memory sections, each memory section comprising first through X th memory units connected to said write address counter, to said selector unit, and to said address control memory and supplied with said input data signal;

wherein each of the data time slots of said unit frames is written into said single data memory as stored time slots in one of said memory units designated by said write count signal in one of said memory section which is designated by said selected sequences;

said address control memory generates a read address signal in accordance with said red count signal and said address memory control signal, wherein said stored time slots are read as said switched time slots, each switched time slot from one of said memory units being indicated by said read count signal in one of said memory sections which is indicated by said address memory control signal.

3. A time slot switching device as claimed in claim 2, each of said multiframes having multiple frame lengths not longer than a predetermined maximum multiframe length, wherein each of said switch mode memory, a concatenation of the N times X memory units of said memory sections, and said address control memory has a memory capacity of at least said predetermined maximum multiframe length, said multiframe counter having a count length of at least said predetermined maximum multiframe length.

* * * * *